US008837725B2

(12) United States Patent
Teruyama

(10) Patent No.: US 8,837,725 B2
(45) Date of Patent: Sep. 16, 2014

(54) COMMUNICATION SYSTEM AND COMMUNICATION METHOD

(75) Inventor: Katsuyuki Teruyama, Tokyo (JP)

(73) Assignee: Sony Corporation, Tokyo (JP)

( * ) Notice: Subject to any disclaimer, the term of this patent is extended or adjusted under 35 U.S.C. 154(b) by 1382 days.

(21) Appl. No.: 12/088,017

(22) PCT Filed: Jul. 26, 2007

(86) PCT No.: PCT/JP2007/064633
§ 371 (c)(1),
(2), (4) Date: Apr. 11, 2008

(87) PCT Pub. No.: WO2008/013212
PCT Pub. Date: Jan. 31, 2008

(65) Prior Publication Data
US 2010/0150347 A1 Jun. 17, 2010

(30) Foreign Application Priority Data
Jul. 26, 2006 (JP) .................................. 2006-203703

(51) Int. Cl.
H04L 9/32 (2006.01)
G06F 21/00 (2013.01)
G06F 7/04 (2006.01)
G06F 12/14 (2006.01)

(52) U.S. Cl.
USPC ............... 380/255; 713/171; 713/185; 726/9; 726/20

(58) Field of Classification Search
None
See application file for complete search history.

(56) References Cited

U.S. PATENT DOCUMENTS

| 5,109,152 | A * | 4/1992 | Takagi et al. ................. 235/380 |
| 7,231,518 | B1 * | 6/2007 | Bakke ............................. 713/168 |
| 2003/0014649 | A1 * | 1/2003 | Funahashi ..................... 713/186 |
| 2003/0021418 | A1 * | 1/2003 | Arakawa et al. .............. 380/277 |
| 2004/0039708 | A1 * | 2/2004 | Zhang et al. .................... 705/67 |

FOREIGN PATENT DOCUMENTS

| JP | 60 208137 | 10/1985 |
| JP | 60-208137 | 10/1985 |
| JP | 63 232539 | 9/1988 |

(Continued)

OTHER PUBLICATIONS

Schneier, Bruce, "Applied Cryptography: Protocols, Algorithms, and Source Code in C", Second Edition, John Wiley & Sons, Inc., pp. 176-179, 1996.

(Continued)

Primary Examiner — Fatoumata Traore
(74) Attorney, Agent, or Firm — Oblon, Spivak, McClelland, Maier & Neustadt, L.L.P.

(57) ABSTRACT

An information processing apparatus that performs a communication with a device includes a storage unit that stores one or more keys. The information processing apparatus also includes a polling-request generating unit that generates a polling request in which a first identifier identifying a key of the one of more keys is included. The key is identified by the first identifier and a second identifier subordinate to the first identifier. Further, the information processing apparatus includes an obtaining unit that identifies the key from the first identifier included in the polling request and the second identifier, that reads the key from the storage unit, and that decrypts encrypted data by the key to obtain a random number. The encrypted data and the second identifier are included in a polling response supplied to the information processing apparatus in response to the polling request.

11 Claims, 15 Drawing Sheets

(56) References Cited

FOREIGN PATENT DOCUMENTS

| | | |
|---|---|---|
| JP | 63-232539 | 9/1988 |
| JP | 64-81087 | 3/1989 |
| JP | 64 81087 | 3/1989 |
| JP | 4-137840 | 5/1992 |
| JP | 4 137840 | 5/1992 |
| JP | 8-202262 | 8/1996 |
| JP | 8 202262 | 8/1996 |
| JP | 3695464 | 7/2005 |
| WO | 02 076011 | 9/2002 |

OTHER PUBLICATIONS

Office Action issued Aug. 6, 2010, in Japanese Office Action Patent Application No. 2006-203703.

* cited by examiner

COMMUNICATION SYSTEM AND COMMUNICATION METHOD

TECHNICAL FIELD

The present invention relates to communication systems and communication methods, devices, information processing apparatuses and methods, programs, and recording media. Particularly, the present invention relates to a communication system and communication method, a device, an information processing apparatus and method, a program, and a recording medium with which communication can be performed security and very conveniently by a simple configuration.

BACKGROUND ART

As systems that perform near field communication, for example, IC (Integrated Circuit) systems are widely known. In an IC card system, a reader/writer forms what is called an RF (Radio Frequency) field (magnetic field) by generating an electromagnetic wave. Then, when an IC card comes close to the reader/writer, the IC card receives supply of electric power by electromagnetic induction and performs data transmission with the reader/writer.

In the IC card system, if a plurality of IC cards come close to one reader/writer, the reader/writer has to identify each of the plurality of IC cards, specify a counterparty of communication, and perform communication.

As a method for identifying a plurality of IC cards, a method in which IDs as unique identification numbers are assigned to the IC cards and the IDs are reported from the IC cards to a reader/writer has been proposed. If unique IDs are assigned to the IC cards as described above, IDs do not coincide among IC cards.

Furthermore, a method in which a random number is generated and the random number is temporarily used as an own ID in an IC card has been proposed. When random numbers are used as IDs, it could possibly occur that the same random number is used as an ID in a plurality of IC cards. In this case, if a reader/writer sends data to the ID, the plurality of IC cards respond simultaneously to cause interference (collision), so that the reader/writer is not allowed to normally obtain a response from the IC cards.

A proposal has been made to accurately identify each of a plurality of counterparties of communications and prevent receiving responses simultaneously from two or more counterparties of communications while preventing such a situation (e.g., refer to Patent Document 1).
[Patent Document 1] Japanese Patent No. 3695464

DISCLOSURE OF THE INVENTION

Problems to be Solved by the Invention

By the way, when one ID is assigned to one IC card, it is possible to identify the IC card. However, for example, in a case where it is desired to allow using one IC card for a plurality of services and to assign IDs individually for the services, the number of IDs increases, so that it cannot be said that this is an optimal method.

Furthermore, when IDs are assigned to IC cards, the IDs can be read by any reader/writer. Thus, for example, if an IC card is owned, the owner of the card is identified on the basis of the ID thereof, so that problems of privacy or security, such as the invasion of privacy of the person, have existed.

ISO/IEC18092 (NFCIP-1) has been defined as a standard in which NFCIP (Near Field Communication—Interface and Protocol)-1 is standardized, which is a method of identifying IC cards or RFIDs existing in a range where communication with a reader/writer is allowed. According to this standard, collision can be prevented without sending IDs unique to IC cards or RFIDs to a reader/writer.

However, in NFCIP-1, since IDs unique to IC cards or RFIDs are not sent, it is not possible to identify individual ID cards or RFIDs themselves in this state. Thus, if it is needed to identify individual IC card or RFIDs, it can be considered to store IDs unique to IC cards or RFIDs in data areas of chips and to send the unique IDs to a reader/writer as needed. However, according to this method, it is needed to send the IDs unique to IC cards or RFIDs securely by encryption.

The present invention has been made in view of such as situation described above, and is directed to allow performing information communication securely and very conveniently by a simple configuration.

Means for Solving the Problems

A communication system according to an aspect of the present invention is a communication system configured of an information processing apparatus and a device that perform communication, wherein the information processing apparatus comprises first storage means that stores one or more keys; polling-request generating means that generates a polling request including an identifier identifying the key; and obtaining means that reads the key identified by the identifier from the first storage means, and that decrypts encrypted data by the key to obtain a random number, the encrypted data being included in a polling response supplied from the device in response to the polling request; and wherein the device comprises random-number generating means that generates a random number; second storage means that stores one or more keys; reading means that reads a key corresponding to the identifier included in the polling request from the second storage means; encrypting means that encrypts the random number generated by the random-number generating means by the key read by the reading means; and polling-response generating means that generates the polling response including data of the random number encrypted by the encrypting means.

The key may be configured so as to be uniquely identified by a first identifier and a second identifier, the second identifier being subordinate to the first identifier, and each of the first storage means and the second storage means may be configured to store each of the first identifier, the second identifier, and the key in association.

The polling-request generating means may be configured to include the first identifier as the identifier in the polling request, the polling-response generating means may be configured to further include the second identifier in the polling response, and the obtaining means is configured to identify the key from the first identifier included in the polling request and the second identifier included in the polling response and to read the key from the first storage means.

The device may be configured to further comprise first hash calculating means that performs a calculation in which a hash function is applied to the random number generated by the random-number generating means, the polling-response generating means may be configured to further include a first hash value calculated by the first hash calculating means in the polling response, and the information processing apparatus may be configured to further comprise second hash calculating means that performs a calculation in which a hash function is applied to the random number obtained by the obtaining means; and comparing means that compares a second hash value calculated by the second hash calculating means with the first hash value included in the polling response.

A communication method according to the aspect of the communication system of the present invention is a communication method of a communication system configured of an information processing apparatus and a device that perform communication, wherein the information processing apparatus comprises the steps of storing one or more keys; polling-request generating of generating a polling request in which an identifier identifying the key is included; and obtaining of reading the key identified by the identifier, and decrypting encrypted data by the key to obtain a random number, the encrypted data being included in a polling response supplied from the device in response to the polling request; and wherein the device comprises the steps of generating a random number; storing one or more keys; reading a key corresponding to the identifier included in the polling request; encrypting the generated random number by the read key; and generating the polling response including data of the encrypted random number.

In the communication system and communication method according to the aspect of the present invention, each of both parties that perform communication stores one or more keys, data of an identifier indicating which key among the one or more stored keys is to be used is sent from one to the other, and on a receiving side of such data, a generated random number is encrypted using the key corresponding to the identifier, and the encrypted random number is returned to the counterparty from which the data has been sent.

An information processing apparatus according to an aspect of the present invention is an information processing apparatus that performs communication with a device, comprising storage means that stores one or more keys; polling-request generating means that generates a polling request in which an identifier identifying the key is included; and obtaining means that reads the key identified by the identifier from the storage means, and that decrypts encrypted data by the key to obtain a random number, the encrypted data being included in a polling response supplied from the device in response to the polling request.

The key may be configured so as to be uniquely identified by a first identifier and a second identifier, the second identifier being subordinate to the first identifier, and the storage means may be configured to store each of the first identifier, the second identifier, and the key in association.

The polling-request generating means may be configured to include the first identifier as the identifier in the polling request, the polling response may be configured to further include the second identifier, and the obtaining means may be configured to identify the key from the first identifier included in the polling request and the second identifier included in the polling response, and read the key from the storage means.

Hash calculating means that performs a calculation in which a hash function is applied to the random number obtained by the obtaining means, and comparing means that compares a hash value calculated by the hash calculating means with a hash value included in the polling response may be further provided.

A communication method according to the aspect of the information processing apparatus of the present invention is a communication method of an information processing apparatus that performs communication with a device, comprising a reading controlling step of controlling reading of one key from one or more keys stored in storage means; a polling-request generating step of generating a polling request in which an identifier identifying the key is included; and an obtaining step of reading the key identified by the identifier from the storage means under control of the reading controlling step, and decrypting encrypted data by the key to obtain a random number, the encrypted data being included in a polling response supplied from the device in response to the polling request.

A program according to the aspect of a computer that controls the information processing apparatus of the present invention is a program of a computer that controls an information processing apparatus that performs communication with a device, comprising a reading controlling step of controlling reading of one key from one or more keys stored in storage means; a polling-request generating step of generating a polling request in which an identifier identifying the key is included; and an obtaining step of reading the key identified by the identifier from the storage means under control of the reading controlling step, and decrypting encrypted data by the key to obtain a random number, the encrypted data being included in a polling response supplied from the device in response to the polling request.

A recording medium according to the aspect of a computer that controls the information processing apparatus of the present invention has a program recorded thereon, the program causing a computer that controls an information processing apparatus that performs communication with a device to execute processing comprising a reading controlling step of controlling reading of one key from one or more keys stored in storage means; a polling-request generating step of generating a polling request in which an identifier identifying the key is included; and an obtaining step of reading the key identified by the identifier from the storage means under control of the reading controlling step, and decrypting encrypted data by the key to obtain a random number, the encrypted data being included in a polling response supplied from the device in response to the polling request.

In the information processing method, communication method, and program according to the aspect of the present invention, one or more keys are stored, and information for uniquely identifying a stored key is included in a polling request that is generated when communication with another apparatus is performed.

A device according to an aspect of the present invention is a device that performs communication with an information processing apparatus, comprising random-number generating means that generates a random number; storage means that stores one or more keys; reading means that reads a key from the storage means, the key corresponding to an identifier for identifying the key included in a polling request from the information processing apparatus; encrypting means that encrypts the random number generated by the random-number generating means by the key read by the reading means; and polling-response generating means that generates the polling response including data of the random number encrypted by the encrypting means.

The key may be configured so as to be uniquely identified by a first identifier and a second identifier, the second identifier being subordinate to the first identifier, and the storage means may be configured to store each of the first identifier, the second identifier, and the key in association.

The polling-response generating means may be configured to further include the second identifier in the polling response.

Hash calculating means that performs a calculation in which a hash function is applied to the random number generated by the random-number generating means may be further provided, and the polling-response generating means may be configured to further include a hash value calculated by the hash calculating means in the polling response.

A communication method according to the aspect of the device of the present invention is a communication method of a device that performs communication with an information processing apparatus, comprising a random-number generating step of generating a random number; a reading controlling step of controlling processing for reading a key from storage means where one or more keys are stored, the key corresponding to an identifier for identifying the key included in a polling request from the information processing apparatus; an encrypting step of encrypting the random number generated by processing in the random-number generating step by the key whose reading has been controlled by processing in the reading controlling step; and a polling-response generating step of generating the polling response including data of the random number encrypted by processing in the encrypting step.

A program according to the aspect of the device of the present invention is a program of a computer that controls a device that performs communication with an information processing apparatus, comprising a random-number generating step of generating a random number; a reading controlling step of controlling processing for reading a key from storage means where one or more keys are stored, the key corresponding to an identifier for identifying the key included in a polling request from the information processing apparatus; an encrypting step of encrypting the random number generated by processing in the random-number generating step by the key whose reading has been controlled by processing in the reading controlling step; and a polling-response generating step of generating the polling response including data of the random number encrypted by processing in the encrypting step.

A recording medium according to the aspect of the device of the present invention has a program recorded thereon, the program causing a computer that controls a device that performs communication with an information processing apparatus to execute processing comprising a random-number generating step of generating a random number; a reading controlling step of controlling processing for reading a key from storage means where one or more keys are stored, the key corresponding to an identifier for identifying the key included in a polling request from the information processing apparatus; an encrypting step of encrypting the random number generated by processing in the random-number generating step by the key whose reading has been controlled by processing in the reading controlling step; and a polling-response generating step of generating the polling response including data of the random number encrypted by processing in the encrypting step.

In the device, communication method, and program according to the aspect of the present invention, from information for identifying one key among one or more keys, included in a polling request sent from another apparatus, one key is read among one or more keys stored it itself, and a generated random number is encrypted by the key.

Advantages

According to the aspect of the present invention, it is possible to deal with a plurality of information, and to perform communication in a state with high security when these information is communicated.

DESCRIPTION OF SIGNS 50 communication system, 100 reader/writer, 101 secret-key storage unit, 102 input/output unit, 103 RAM, 104 ROM, 105 CPU, 106 cryptographic calculating unit, 200 IC card, 201 input/output unit, 202 random-number generating unit, 203 secret-key storage unit, 204 ID storage unit, 205 data storage unit, 206 ROM, 207 CPU, 208 cryptographic calculating unit, 300 reader/writer, 301 secret-key storage unit, 302 hash calculating unit, 400 IC card, 401 secret-key storage unit, 402 hash calculating unit

BEST MODE FOR CARRYING OUT THE INVENTION

Hereinafter, embodiments of the present invention will be described with reference to the drawings.

[Example of System Configuration]

Figure 1:
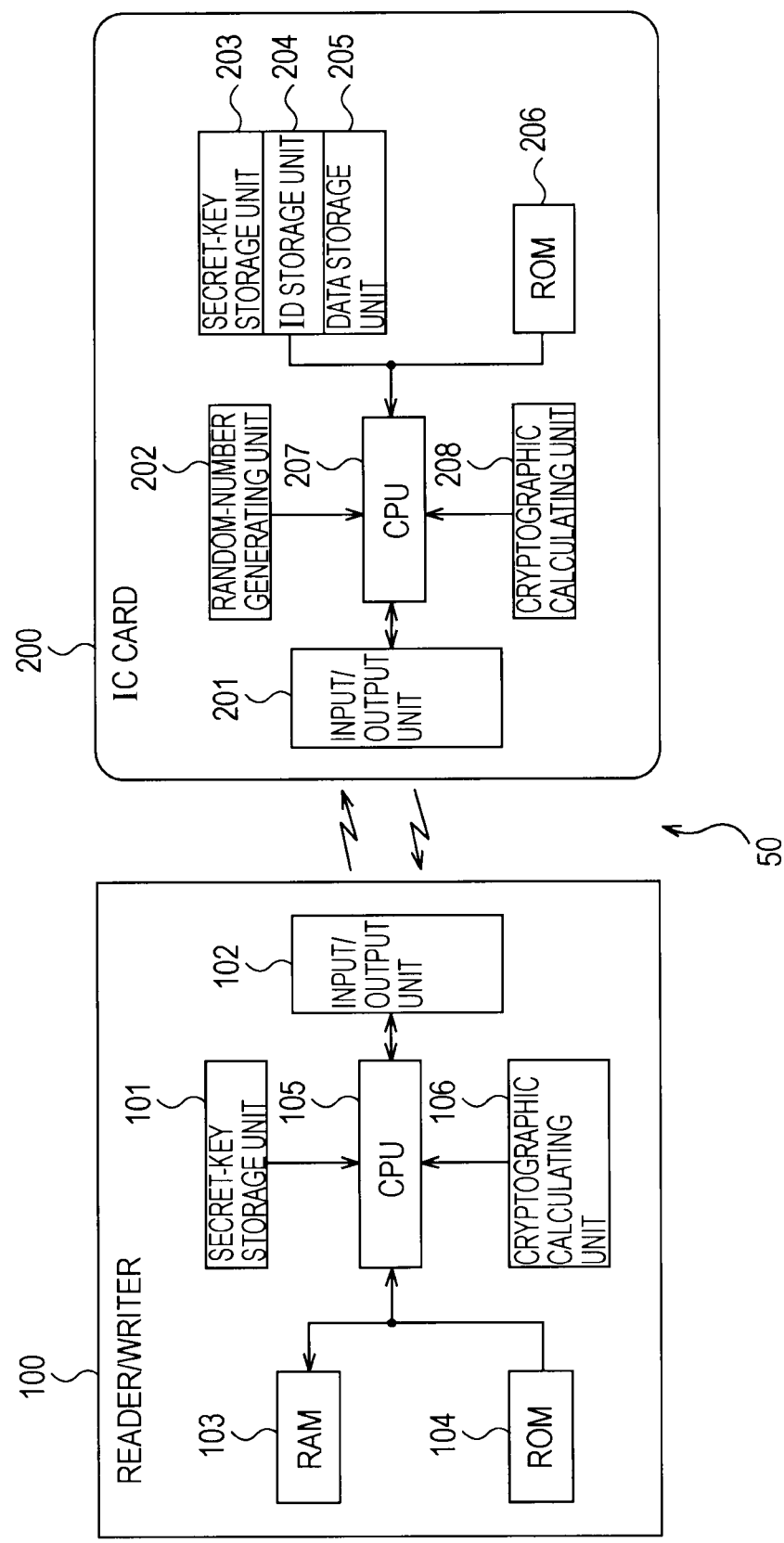
FIG. 1 is a diagram showing a configuration of an embodiment of a communication system to which present invention is applied.

FIG. 1 is a block diagram showing an example configuration in an embodiment of a communication system 50 to which the present invention is applied. The communication system 50 is configured of a reader/writer 100 and an IC card 200, and, for example, the reader/writer 100 and the IC card 200 perform communication by wireless via their individual antennas or the like.

The reader/writer 100 is configured to include a secret-key storage unit 101, an input/output unit 102, a RAM (Random Access Memory) 103, a ROM (Read Only Memory) 104, a CPU (Central Processing Unit) 105, and a cryptographic calculating unit 106.

The IC card 200 is configured to include an input/output unit 201, a random-number generating unit 202, a secret-key storage unit 203, an ID storage unit 204, a data storage unit 205, a ROM 206, a CPU 207, and a cryptographic calculating unit 208.

The input/output unit 102 is configured to radiate predetermined electromagnetic waves, and detects whether the IC card 200 is placed in proximity on the basis of change in the load caused thereby, and to have an antenna (not shown) that exchanges various types of data with the IC card 200 when, for example, the IC card 200 is placed in proximity.

The input/output unit 102, for example, ASK (Amplitude Shift Keying)-modulates a carrier wave having a predetermined frequency, supplied from an oscillation circuit (OSC), on the basis of data supplied from the CPU 105, and outputs the generated modulated wave from an antenna as an electromagnetic wave. Furthermore, the input/output unit 102 demodulates a modulated wave (ASK-modulated wave) obtained via the antenna, and supplies the demodulated data to the CPU 105.

The CPU 105 of the reader/writer 100 loads programs stored in the ROM 104 into the RAM 103, or the like, thereby executing various types of processing. Furthermore, as needed, the RAM 103 stores data or the like needed when the CPU 101 executes various types of processing.

The CPU 105 is configured to be capable of encrypting and decrypting data according to a predetermined cryptographic algorithm by controlling the cryptographic calculating unit 106. Here, as the cryptographic algorithm of the cryptographic calculating unit 106, a cryptographic algorithm such as DES (Data Encryption Standard), triple DES, or AES (Advanced Encryption Standard), which is a cryptographic algorithm of what is called a secret-key (common-key) cryptosystem, can be used.

When the reader/writer 100 encrypts or decrypt data, for example, the CPU 105 supplies a secret key stored in the secret-key storage unit 101 to the cryptographic calculating unit 106 together with the data that is to be encrypted or decrypted, so that the cryptographic calculating unit 106 executes encryption or decryption of the supplied data using the supplied secret key.

As will be described later, secret keys stored individually in the reader/writer 100 and the IC card 200 are basically the same keys. However, in this embodiment, it is allowed to store one or more keys, and it is not necessary that all the stored keys are the same keys.

The input/output unit 201 of the IC card 200 is configured, for example, to have an LC circuit configured of a coil-shaped antenna and a capacitor, and the LC circuit is configured to resonate with an electromagnetic wave having a predetermined frequency, radiated from the reader/writer 100 disposed in proximity. Furthermore, the input/output unit 201, by ASK demodulation, rectifies an alternating-current magnetic field excited at an antenna, stabilizes it, and supplies the result to each part as a direct-current power supply. The power of the electro-magnetic wave radiated from the reader/writer 100 is adjusted so as to generate a magnetic field that provides power needed for the IC card 200.

Furthermore, the input/output unit 201, by envelope detection, demodulates a modulated wave (ASK-modulated wave) received via the antenna, BPSK (Binary Phase Shift Keying)—demodulates the demodulated data and supplies the result to the CPU 207, and generates a clock signal having the same frequency as a clock frequency of the received signal and supplies the clock signal to the CPU 207.

Furthermore, when sending predetermined information to the reader/writer 100, the input/output unit 201, for example, on the basis of variation in the load of the antenna, ASK-modulates data supplied from the CPU 207 and BPSK-modulated, and sends the modulated components to the reader/writer 100 via the antenna.

The CPU 207 of the IC card 200 executes various types of processing by executing programs stored in the ROM 204, or the like. The secret-key storage unit 203, the ID storage unit 204, and the data storage unit 205 are formed of an EEPROM (Electrically Erasable Programmable Read-Only Memory) or the like, each occupying a part of the storage area of the EEPROM.

The CPU 207 is configured to be capable of encrypting and decrypting data according to a predetermined cryptographic algorithm by controlling the cryptographic calculating unit 208. Here, the cryptographic algorithm of the cryptographic calculating unit 208 is the same algorithm as the cryptographic algorithm of the cryptographic calculating unit 106 on the side of the reader/writer 100.

When data is encrypted or decrypted in the IC card 200, for example, the CPU 207 supplies a secret key stored in the secret-key storage unit 203 to the cryptographic calculating unit 208 together with the data that is to be encrypted or decrypted, so that the cryptographic calculating unit 208 executes encryption or decryption of the supplied data using the supplied secret key.

The random-number generating unit 202 generates a random number having a predetermined number of digits, as needed. As will be described later in detail, in communication performed between the IC card 200 and the reader/writer 100, this random number is used as a session key used for encryption or decryption of a session ID for mutually identifying communication counterparties between these parties and of data exchanged in the session.

The ID storage unit 204 stores a card ID, which is identification information unique to the IC card 200.

The data storage unit 205 stores, as needed, application data or the like for providing various services or the like that are performed using the IC card 200.

Note that it is possible to configure each of the cryptographic calculating unit 106 and the cryptographic calculating unit 208 as software.

Since the reader/writer 100 and the IC card 200 perform communication by wireless as described above, there arises a concern for what is called a collision, in which two or more IC cards or reader/writers emit electromagnetic waves simultaneously, and as a result, it becomes impossible for an IC card or reader/writer to distinguish which target an electromagnetic wave has been emitted from. However, each of the reader/writer 100 and the IC card 200 in the communication system 50 performs communication that conforms to NFCIP (Near Field Communication—Interface and Protocol)-1, which is a communication method in which IC cards or RFIDs existing in a range where communication with a reader/writer is allowed can be identified.

NFCIP-1 includes schemes for RF detection and collision avoidance in order to achieve compatibility with communication by other NFCIP-1 devices and communication by other devices performing communication in the same band, and an identifier of NFC device called an NFC identifier (NFCID), which uses a random number used at the time of RF collision avoidance and in a single-device detecting process, is used. For example, in many existing communication systems, unique IDs of IC cards are sent to a reader/writer, and the reader/writer identifies the individual IC cards on the basis of the IDs, thereby trying to prevent collision. In NFCIP-1, it is not needed to send unique IDs of IC cards to a reader/writer.

Thus, in the communication system 50, without sending a card ID unique to the IC card 200 to the reader/writer 100, each of the reader/writer 100 and the IC card 200 can uniquely identify a counterparty of communication, so that collision can be prevented.

Note that NFCIP-1 is described in detail in ISO/IEC18092.

Hereinafter, a description will be given by way of an example where the reader/writer 100 operates as an initiator defined in NFCIP-1 and the IC card 200 operates as a target defined in NFCIP-1.

[Regarding System Operation]

Next, an operation of the communication system 50 shown in FIG. 1 will be described with reference to flowcharts in FIGS. 2 to 5.

Note that the following description will describe processing relating to exchange of information at a stage before exchange of data (at a stage before a service is performed), for example, copying data stored in one of the reader/writer 100 and the IC card 200 to the other. That is, processing at the time of establishing a session, executed at a stage before exchanging data, will be described.

Furthermore, an overview of an operation of the communication system 50 as a whole will be described with reference to a flowchart in FIG. 2. Then, details of processing in each step will be described with reference to FIGS. 3 to 5.

In step S101, the reader/writer 100 generates a polling request and sends it to the IC card 200. If the IC card 200 is located within such a distance that communication by the reader/writer 100 is allowed, in step S121, the IC card 200 receives the polling request from the reader/writer 100.

In step S122, the IC card 200 generates a session key by encrypting a random number, and sends a polling response including the session key to the reader/writer 100. In step S102, the reader/writer 100 receives the polling response from the IC card 200, and in step S103, executes a random-number obtaining process for obtaining the random number encrypted on the side of the IC card 200.

When a state where communication is allowed has been established through execution of such processing between the reader/writer 100 and the side of the IC card 200, for example, processing such as exchanging data from one to the other is performed in a state where security is maintained in the established session.

On the other hand, for example, if the random number encrypted on the side of the IC card 200 does not match the random number obtained on the side of the reader/writer 100, a state where communication is allowed has not been established, so that processing such as not executing subsequent communication is performed.

Next, details of processing performed in each step shown in FIG. 2 will be described. First, a polling-request generating and sending process performed by the reader/writer 100 in step S101 will be described with reference to a flowchart in FIG. 3.

In step S211, the CPU 105 (FIG. 1) of the reader/writer 100 selects one secret key from a plurality of secret keys (one or more secret keys) stored in the secret-key storage unit 101.

Figure 6:
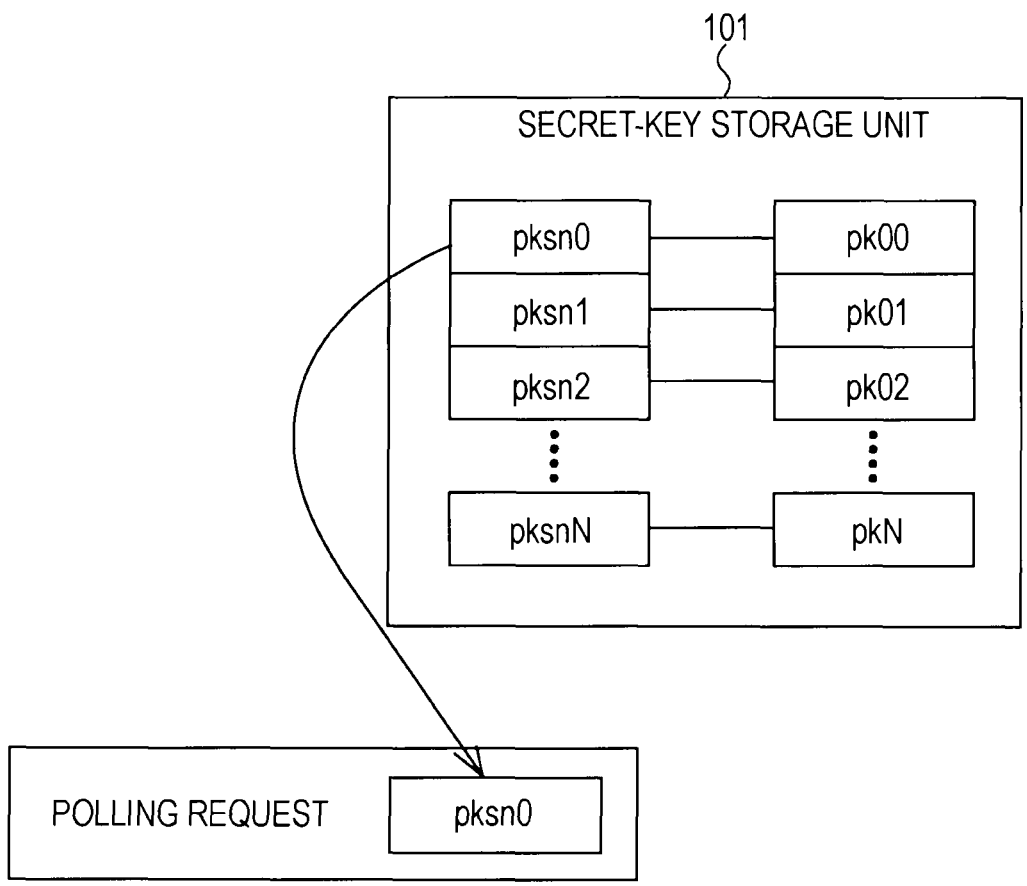
FIG. 6 is a diagram for explaining generation of a polling request.

Here, secret keys stored in the secret-key storage unit 101 will be additionally described with reference to FIG. 6. In the example shown in FIG. 6, the secret-key storage unit 101 stores N secret keys, namely, secret keys pk00 to pkN. Furthermore, for identification of the individual secret keys, N identifiers, namely, identifiers pksn0 to pksnN are stored respectively in association with pk00 to pkN.

Here, pk is an abbreviation of Pre-shared Key, and it denotes a secret key shared in advance between both the reader/writer 100 and the IC card 200 (initiator and target). pksn is an abbreviation of Pre-shared Key Slot Number, and it denotes a number for identifying each Pre-shared Key.

In the following description, when individual distinction among the secret keys pk00 to pkN is not needed, they will be denoted simply as secret keys pk. Other keys, identifiers, and so forth will be denoted similarly.

In step S211, one secret key pk is selected among the secret keys pk00 to pkN stored in the secret-key storage unit 101, and an identifier pksn for identifying the selected secret key pk is read. Note that, since processing using the secret key pk is not executed at this stage, instead of reading the identifier pksn corresponding to the selected secret key pk after the selection of the secret key pk, the identifier pksn may be selected and read. Here, the description will be continued assuming that the secret key pk00 is selected and the identifier pksn0 corresponding to the secret key pk00 is read (the identifier pksn0 is selected and read).

Which secret key pk is to be selected among the plurality of secret keys pk is selected on the basis of a predetermined condition, for example, a secret key that is not currently being used in communication with other IC cards 200 is selected, a secret key is selected in accordance with an IC card 200 that serves as a counterparty of communication, or the like.

In step S212, a polling request is generated. The generated polling request includes the identifier pksn read in processing of step S211. For example, as shown in FIG. 6, a polling request in which the identifier pksn0 is stored is generated.

Figure 7:
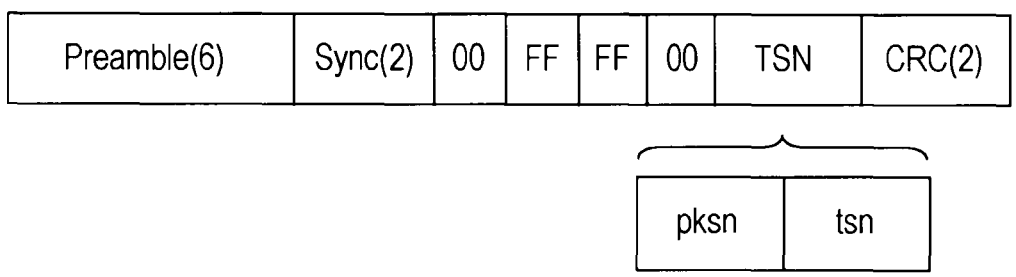
FIG. 7 is a diagram for explaining a data structure of a polling request.

FIG. 7 is a diagram showing a data structure of the polling request that is generated. The polling request shown in FIG. 7 shows a data structure in a case where the reader/writer 100 and the IC card 200 perform communication according to a method defined in NFCIP (Near Field Communication—Interface and Protocol)-1.

Preamble is a field configured of 6 bytes, where data of all logic "0"s is stored. Sync is a field configured of 2 bytes, where data for synchronization that is used for synchronization of communication between an initiator and a target is stored. CRC (Cyclic Redundancy Check) is a field configured of 2 bytes, where data used for error detection and calculated by a predetermined method is stored.

TSN is an abbreviation of Time Slot Number. TSN (Time Slot Number) is data indicating a number specifying a time range in which a receiving side of a polling request sends a polling response in the NECIP-1 standard. This TSN is an 8-bit field.

Although TSN is an 8-bit field, in order just to represent Time Slot Number, it is possible to use 4 bits for representation among the 8 bits. Thus, in this embodiment, 4 bits in the 8-bit field of TSN are allocated to data representing Time Slot Number (denoted as tsn in FIG. 7), and the remaining 4 bits are allocated to data representing an identifier pksn (denoted as pksn in FIG. 7).

In step S212, a polling request having the data structure shown in FIG. 7 is generated. When the polling request is generated, the identifier pksn read from the secret-key storage unit 101 is stored in the polling request. The identifier pksn is stored in the 4-bit area of TSN constituting the polling request.

The generated polling request is sent to the IC card 200 in step S213.

The CPU 105 (FIG. 1) reads the identifier pksn identifying the secret key pk from the secret-key storage unit 101, generates a polling request including the identifier pksn, and controls the input/output unit 102 to send the polling request to the IC card 200. Furthermore, as needed, the CPU 105 stores the identifier pksn included in the polling request in the RAM 103.

Figure 2:
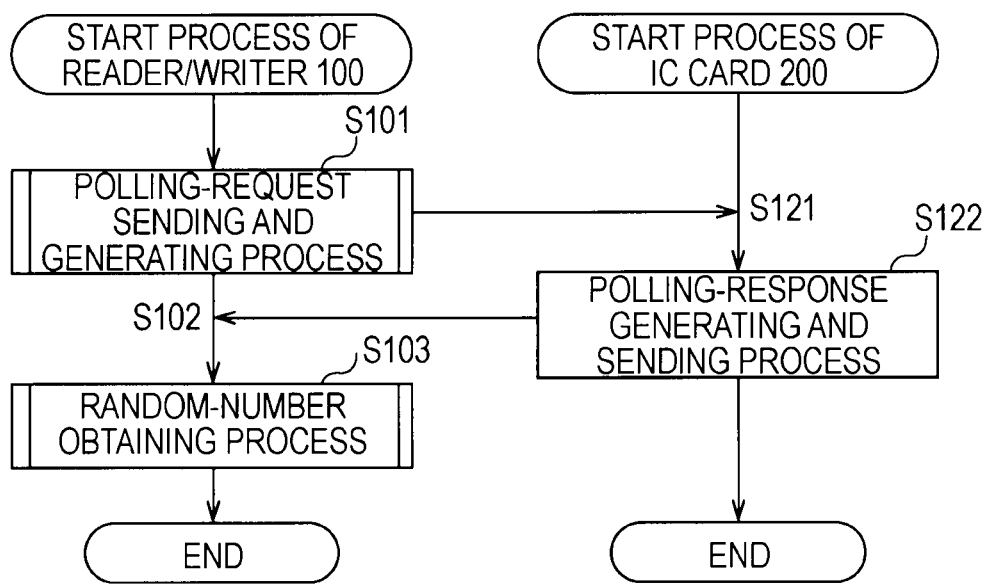
FIG. 2 is a flowchart that explains an operation of the communication system shown in FIG. 1.

The polling request generated by the reader/writer 100 as described above is received by the IC card 200 existing in a communication range in step S121 (FIG. 2). In step S122, the IC card 200 that has received the polling request executes a polling-response generating and sending process. The polling-response generating and sending process executed in step S122 will be described with reference to a flowchart in FIG. 5.

In step S231, the random-number generating unit 202 generates a random number A.

In step S232, the CPU 207 stores the generated random number A, for example, in a predetermined area determined in advance in the data storage unit 205.

In step S233, the CPU 207 reads the identifier pksn included in the polling request received by the input/output unit 201, and reads the secret key pk corresponding to the read identifier pksn from the secret-key storage unit 203.

Figure 8:
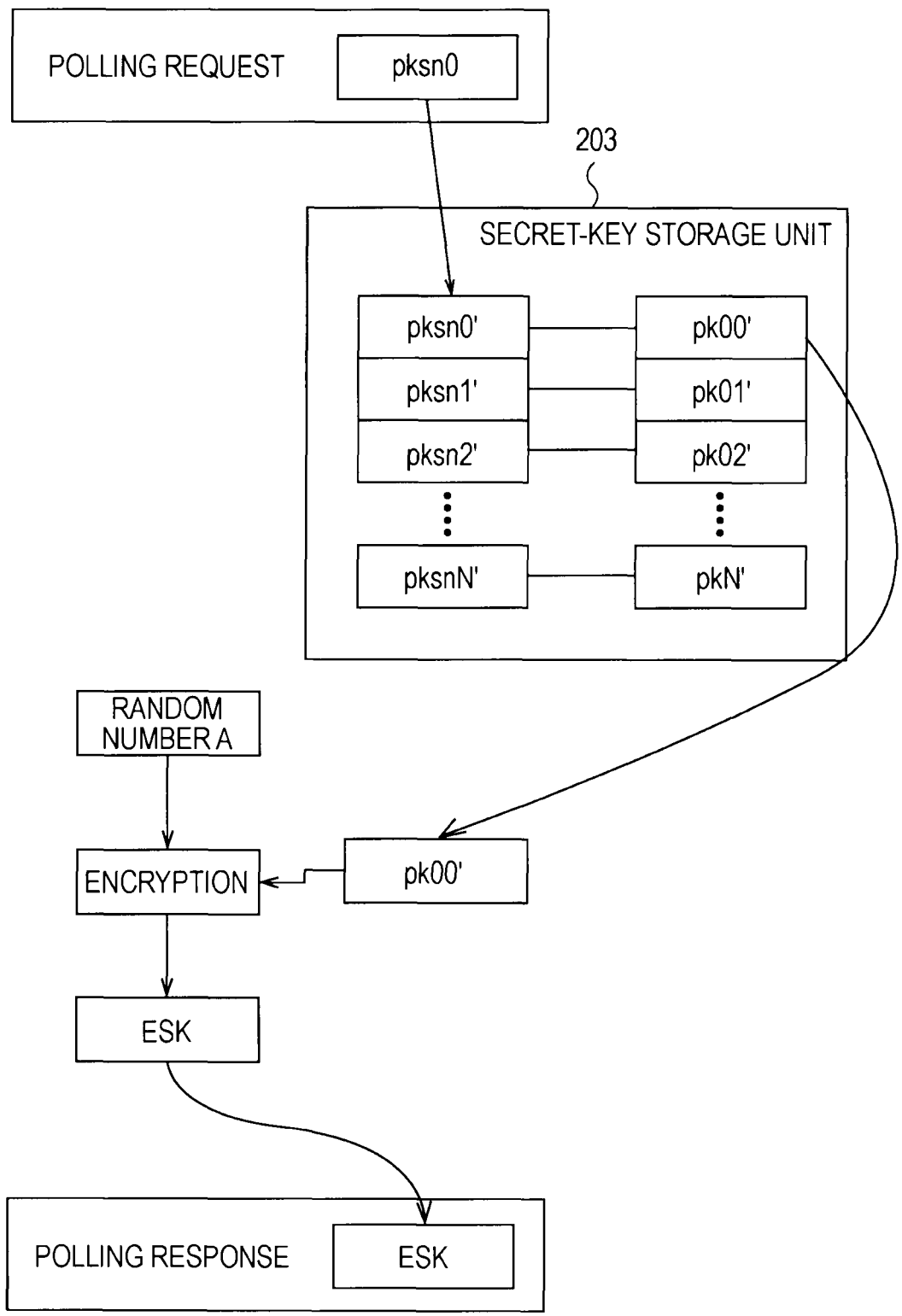
FIG. 8 is a diagram for explaining generation of a polling response.

Here, with reference to FIG. 8, secret keys stored in the secret-key storage unit 203 will be additionally described. In the example shown in FIG. 8, in the secret-key storage unit 203, N secret keys, namely, secret keys pk00' to pkN', are stored. Furthermore, for distinction of the individual secret keys, N identifiers, namely, identifiers pksn0' to pksnN', are stored respectively in association with pk00' to pkN'.

As described above, in the secret-key storage unit 203 of the IC card 200 and the secret-key storage unit 101 of the reader/writer 100, basically, the same pairs of secret key and identifier are stored. Here, in order to distinguish secret keys and identifiers stored individually in the secret-key storage unit 203 of the IC card 200 and the secret-key storage unit 101 of the reader/writer 100, secret keys and identifiers stored in the secret-key storage unit 203 of the IC card 200 will be denoted with dashes (') attached.

Note that, although it has been described that the same pairs of secret key and identifier are stored in the secret-key storage unit 203 of the IC card 200 and the secret-key storage unit 101 of the reader/writer 100, all the pairs of secret key and identifier that are stored need not be the same. In other words, there may exist secret keys and identifiers that are stored only in one or the other.

When a secret key and identifier stored only in one or the other exist and such a secret key is used, it is not allowed to establish communication. By using this, it becomes possible to select a counterparty of communication by selecting a secret key. That is, for example, a secret key is selected in step S211 (FIG. 3) in the process on the side of the reader/writer 100 as described above, and at this time, by using a configuration in which a secret key presumably stored by a desired counterparty of communication, it becomes possible to select a counterparty of communication.

Figure 4:
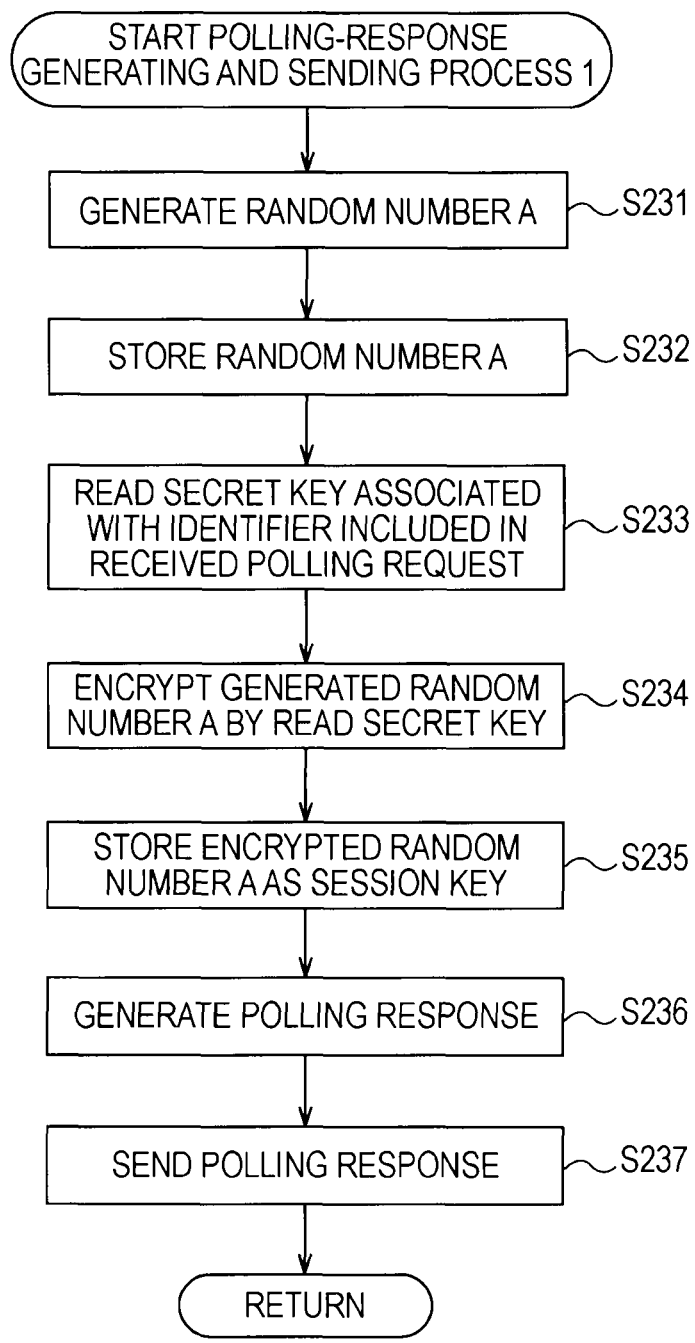
FIG. 4 is a flowchart that explains a polling-response generating and sending process executed in step S122.

Returning to description of the flowchart in FIG. 4, in step S233, when the identifier pksn included in the received polling request has been read and the secret key pk' corresponding to the identifier pksn has been read from the secret-key storage unit 203, in step S234, the random number A is encrypted by the read secret key pk'.

Returning to description with reference to FIG. 8, when a polling request including the identifier pksn0 has been received by the input/output unit 201 (FIG. 1), the CPU 207 reads the secret key pk00' corresponding to the identifier pksn0' from the secret-key storage unit 203. The random number A generated by the random-number generating unit 202 is encrypted using the read secret key pk00' as a key.

The CPU 207 supplies the secret key pk' read from the secret-key storage unit 203 to the cryptographic calculating unit 208, and also supplies the random number A generated by the random-number generating unit 202 to the cryptographic calculating unit 208. The cryptographic calculating unit 208 encrypts the supplied random number A using the secret key pk' as a key. The encrypted random number A will herein be denoted as a session key ESK. ESK herein is an abbreviation of Encrypted Session Key.

In step S235, the CPU 207 stores data of the result of processing in step S234 (i.e., the session key ESK, which is the encrypted random number A), for example, in a predetermined area determined in advance in the data storage unit 205.

In step S236, a polling response is generated. The generated polling response includes the session key ESK generated in step S234, as shown in FIG. 8.

Figure 9:
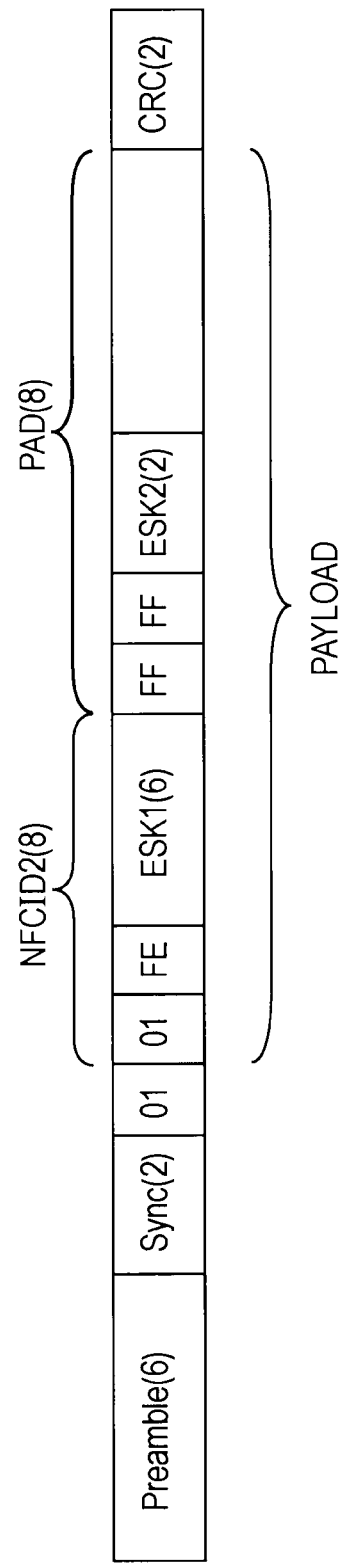
FIG. 9 is a diagram for explaining a data structure of a polling response.

FIG. 9 is a diagram showing the data structure of the generated polling request. The polling response shown in FIG. 9 shows the data structure in a case where the reader/writer 100 and the IC card 200 perform communication according to a method defined in NFCIP (Near Field Communication—Interface and Protocol)-1.

Preamble is a field configured of 6 bytes, where data of all logic "0"s is stored. Sync is a field configured of 2 bytes, where data for synchronization used for synchronization of communication between an initiator and a target is stored. CRC (Cyclic Redundancy Check) is a field configured of 2 bytes, where data used for error detection and calculated by a predetermined method is stored.

In a payload, data having a start byte "01" and including 8-byte NFCID2 and 8-byte PAD is stored. The session key ESK (the encrypted random number A) is divided into two data, namely, ESK1, and ESK2, which are stored respectively in the field of NFCID2 and the field of PAD.

Here, it is assumed that the session key ESK is configured of 8 bytes, with ESK1 having 6 bytes and ESK2 having 2 bytes. Of the 8-byte session key ESK, the first 6 bytes serve as ESK1, and the remaining 2 bytes serve as ESK2.

In step S236, a polling response having the data structure shown in FIG. 9 is generated. Furthermore, in the generated polling response, as described above, the session key ESK is divided into two data, which are stored individually in different portions of the payload.

In step S237, the generated polling response is sent to the reader/writer 100. The CPU 207 (FIG. 1) sends the generated polling response to the reader/writer 100 by controlling the input/output unit 201.

The polling response generated by the IC card 200 as described above is received in step S102 (FIG. 2). In step S103, the reader/writer 100 that has received the polling response executes a random-number obtaining process. The random-number obtaining process executed in step S103 will be described with reference to a flowchart in FIG. 5.

In step S251, the CPU 105 obtains the session key ESK, i.e., the encrypted random number A, included in the polling response from the IC card 200.

In step S252, the CPU 105 stores the session key ESK obtained by processing in step S251, for example, in a predetermined area of the RAM 103.

In step S253, the cryptographic calculating unit 106 decrypts the encrypted random number A, which is the session key ESK obtained by the processing in step S251, using the secret key pk stored in the secret-key storage unit 101. The secret key pk that is used is the secret key pk corresponding to the identifier pksn included in the polling request. Here, a random number obtained as a result of decryption will be denoted as a random number B.

In step S254, the CPU 105 stores the decrypted random number B, for example, in a predetermined area of the RAM 103.

Figure 10:
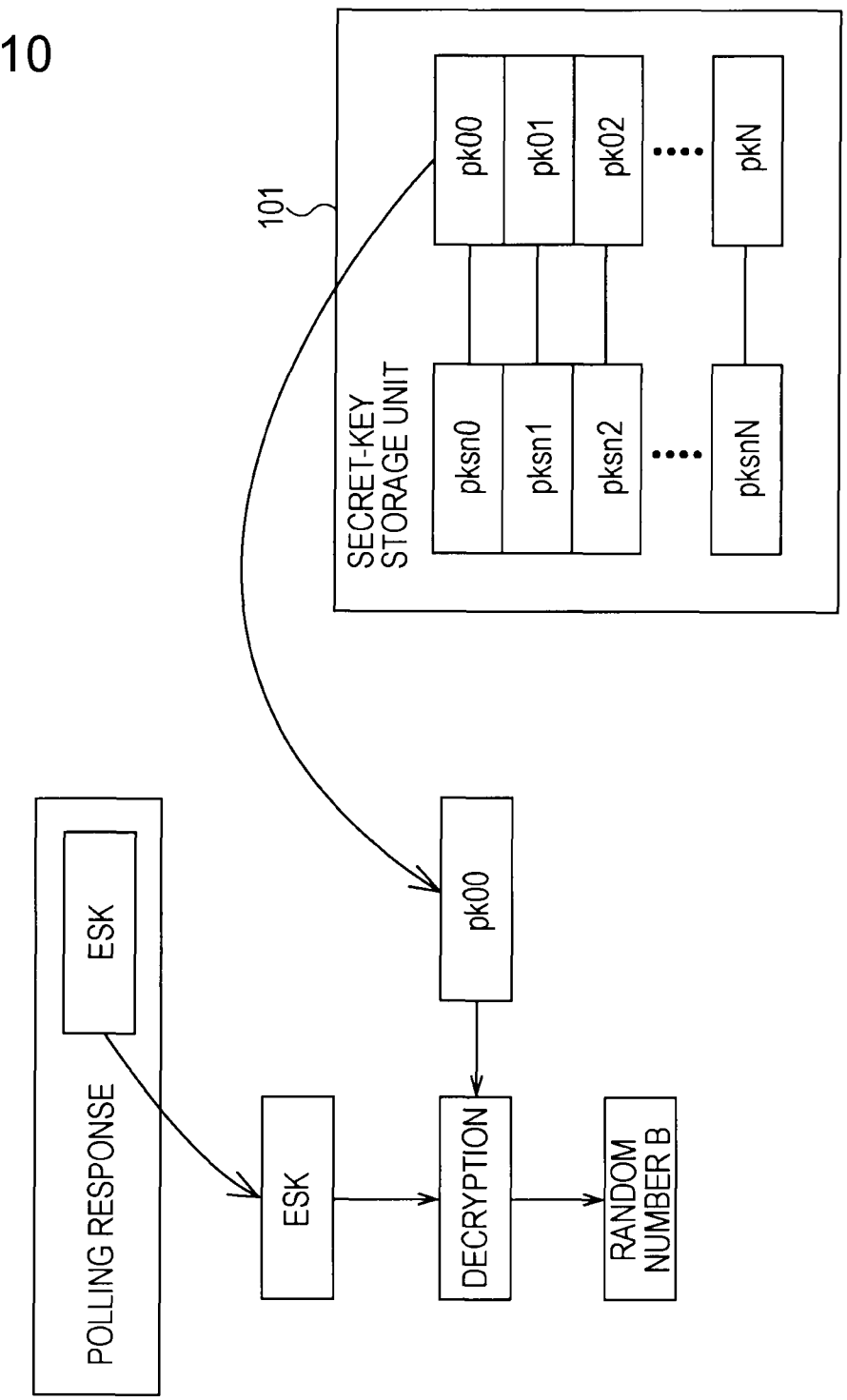
FIG. 10 is a diagram for explaining a process at a time of obtaining a random number B from a polling response.

The process of the flowchart in FIG. 5 will be described again with reference to FIG. 10. When the polling response including the session key ESK has been received by the input/output unit 101 of the reader/writer 100, the CPU 105 obtains the session key ESK included in the polling request, and supplies the session key ESK to the cryptographic calculating unit 106.

The CPU 101 reads the secret key pk00 corresponding to the identifier pksn00 included in the polling request from the secret-key storage unit 101, and supplies the secret key pk00 to the cryptographic calculating unit 106. As described above, the session key ESK and the secret key pk00 are supplied to the cryptographic calculating unit 106, the cryptographic calculating unit 106 decrypts the session key ESK using the secret key pk00 as a key to obtain the random number B.

If the random number B obtained on the side of the reader/writer 100 as described above matches the random number A generated on the side of the IC card 200, it is possible to perform communication using the random number A (the random number B). For example, it becomes possible for the reader/writer 100 and the IC card 200 to uniquely identify each other on the basis of the session key ESK generated using the random number A (the random number B) and to encrypt or decrypt data as needed using the random number A as a key.

If the random number A does not match the random number B, the session key ESK generated using the random number A and the session key ESK generated using the random number B become different session keys ESK. Thus, mutual unique identification is not allowed, so that it is not possible to perform communication.

[Anther Configurations of System]

In the embodiment described above, for example, as described with reference to FIG. 7, to data of the identifier pksn, included in data of a polling request, 4 bits are allocated. When the identifier pksn is represented by 4 bits, 16 identifiers can be represented. Thus, it is possible to deal with 16 pairs of secret key pk and identifier pksn in each of the reader/writer 100 and the IC card 200.

For example, in a case where one secret key pk is used in association with one service, it is possible to deal with 16 services.

However, when it is desired to deal with 16 or more secret keys pk, this is not allowed. Thus, the configuration of a communication system 50 in a case where it is possible to deal with 16 or more secret keys pk will be described.

Here, since it is assumed that the identifier pksn included in a polling request is represented by 4 bits, it has been described that it is possible to deal with 16 secret keys pk. However, the present invention is not limited to 4 bits, and it is obviously possible to apply the present invention to cases other than 4 bits. When setting is such that representation other than 4 bits is used, the number of secret keys pk that can be dealt with is determined depending on the number of bits of the setting.

Thus, for example, in a case where the identifier pksn is represented by a number of bits that is greater than or equal to 4 bits, it is possible to deal with 16 or more services. In this manner, it is possible to increase the number of identifiers pksn or secret keys pk that can be dealt with. Here, a method of increasing the number of secret keys pk that can be dealt with without increasing the number of bits will be described.

Figure 11:
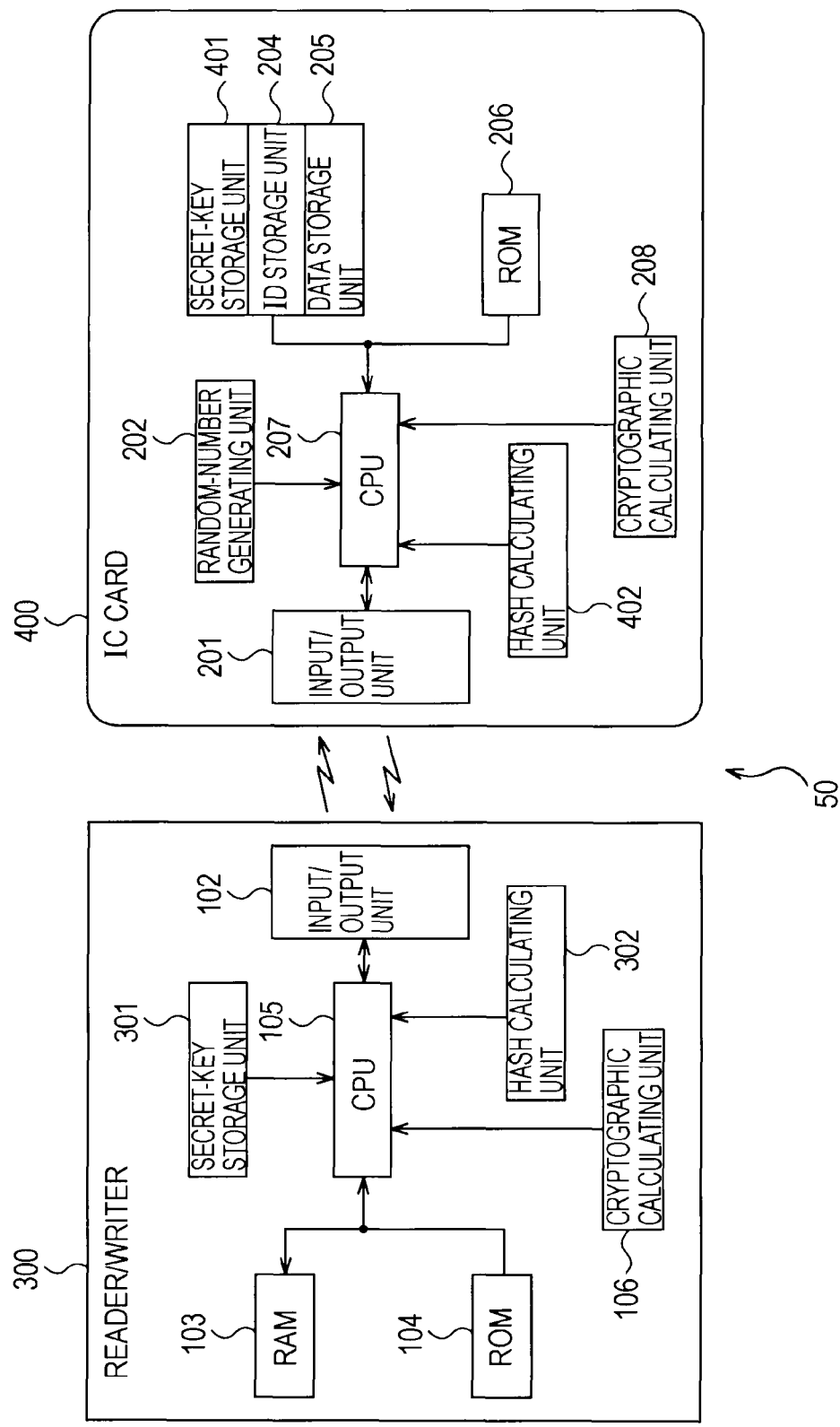
FIG. 11 is a diagram showing another configuration of a communication system to which the present invention is applied.

FIG. 11 is a diagram showing another configuration of the communication system 50. In the configurations of the communication system 50 shown in FIG. 11 and the communication system 50 shown in FIG. 1, the same parts are designated by the same signs, and descriptions thereof will be omitted as appropriate.

As described above, the communication system 50 shown in FIG. 11 includes a reader/writer 300 and an IC card 400. The reader/writer 300 includes a secret-key storage unit 301 storing secret keys pk having a hierarchical structure that will be described later. Similarly, the IC card 400 includes a secret-key storage unit 401 storing secret keys pk' having a hierarchical structure.

The reader/writer 300 is configured to have a hash calculating unit 302. Also, the IC card 400 is configured to have a hash calculating unit 402. As will be described later in detail, each of the hash calculating unit 302 and the hash calculating unit 402 performs a calculation in which a hash function is applied. By comparing hash values calculated as results thereof, the reliability of data, which is herein the secret key pk as will be described later, is checked.

The configuration is otherwise the same as that in FIG. 1, so that description thereof will be omitted.

Figure 12:
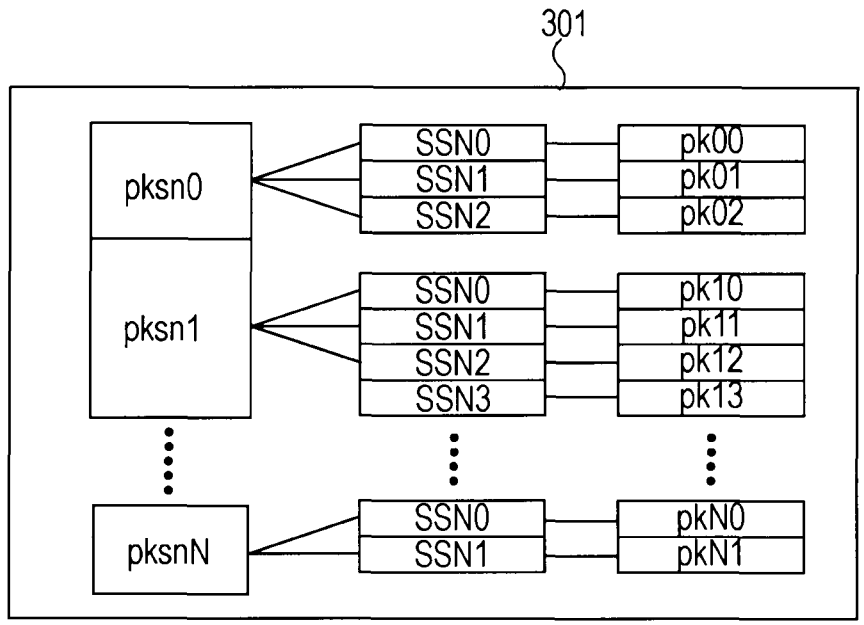
FIG. 12 is a diagram for explaining secret keys stored in a secret-key storage unit 301.

FIG. 12 is diagram for explaining secret keys pk stored in the secret-key storage unit 301. In the example shown in FIG. 12, N identifiers, namely, identifiers pksn0 to pksnN, are stored. The identifier pksn0 is associated with three identifiers, namely, sub-identifiers SSN0 to SSN2. Furthermore, the sub-identifiers SSN0 to SSN2 are associated with the secret keys pk00 to pk02, respectively.

That is, in this case, three secret keys pk00 to 02 are associated with one identifier pksn0. Note that SSN is herein an abbreviation of Sub Slot Number.

Similarly, also for other identifiers pksn, a plurality of sub-identifiers SSN are associated with one identifier pksn, and one secret key pk is associated with one sub-identifier SSN. That is, a plurality of sub-identifiers SSN and a plurality of secret keys pk are associated with one identifier pksn.

Note that there is no limitation as to the number of sub-identifiers SSN (secret keys pk) that are associated with one identifier pksn. The example shown in FIG. 12 is only an example, and, for example, there is not such a limitation that three sub-identifiers SSN0 to 2 are associated with the identifier pksn0.

As described above, in the secret-key storage unit 301, a plurality of secret keys pk are associated with one identifier pksn0. By providing sub-identifiers SSN as described above, it is allowed to store (deal with) a plurality of secret keys pk.

Here, although only an example of keys having a hierarchical structure and stored in the secret-key storage unit 301 of the reader/writer 100 is shown, keys having a similar hierarchical structure are also stored in the secret-key storage unit 401 of the IC card 400.

Next, an operation of the communication system 50 shown in FIG. 11 will be described. The overview of the operation of the communication system 50 is similar to the case described with reference to the flowchart shown in FIG. 2, so that description thereof will be omitted.

Figure 3:
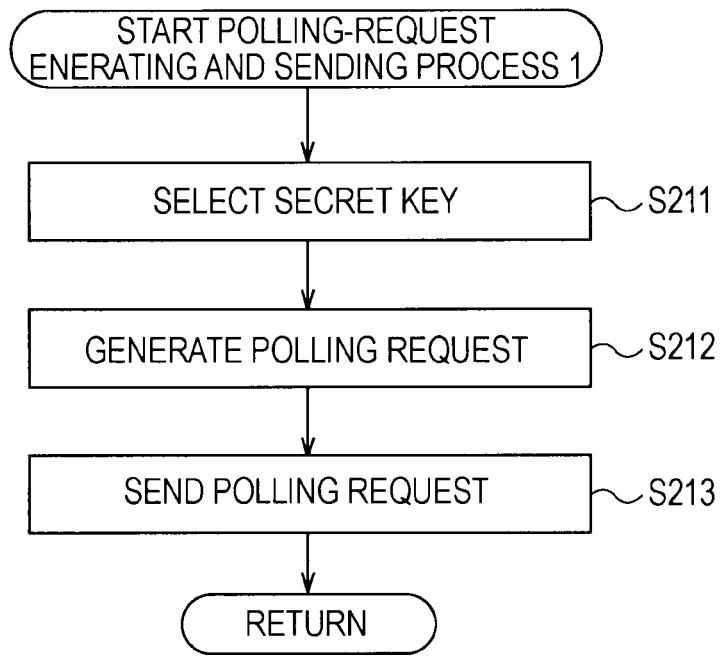
FIG. 3 is a flowchart that explains details of a polling-request generating and sending process executed in step S101.

Furthermore, the polling-request generating and sending process executed in step S101 (FIG. 2) as an operation of the reader/writer 300 is executed similarly to the case described with reference to the flowchart shown in FIG. 3. Thus, although detailed description thereof will be omitted, brief description will be added with reference to FIG. 13.

Figure 13:
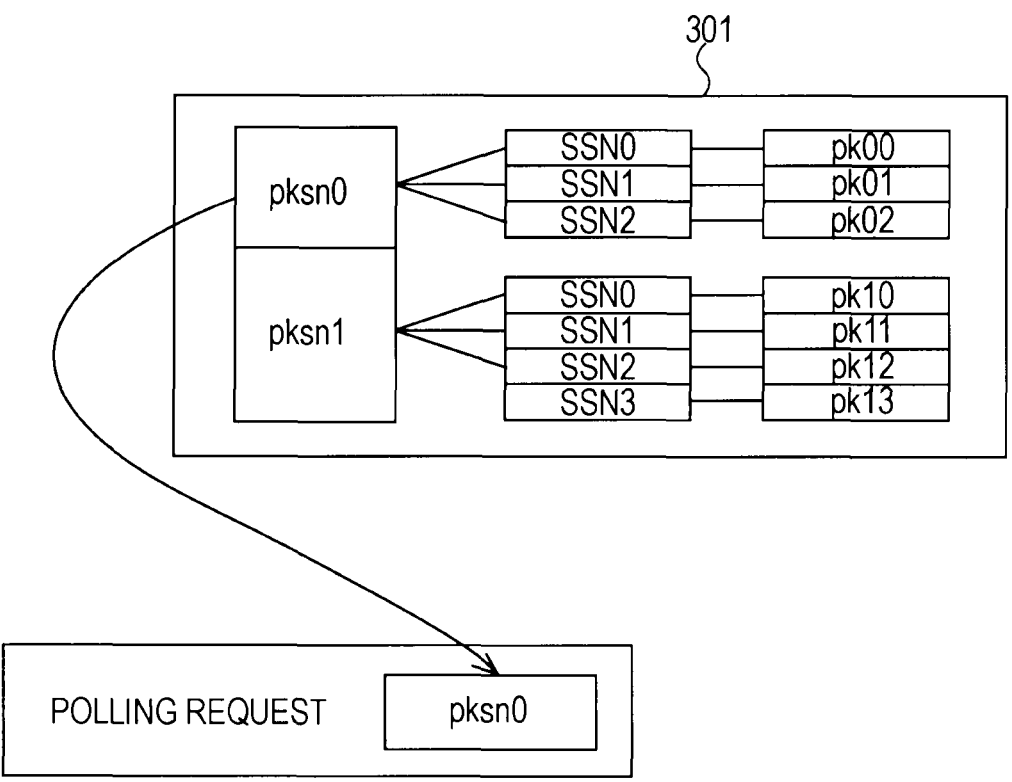
FIG. 13 is a diagram for explaining generation of a polling request.

As shown in FIG. 13, in the secret-key storage unit 301 of the reader/writer 300, secret keys pk having a hierarchical structure are stored. The CPU 105 (FIG. 11) reads, for example, the identifier pksn0 from the secret-key storage unit 301, and stores the identifier pksn0 in a polling request. The polling request in which the identifier pksn0 has been stored is sent to the IC card 400 by the input/output unit 102.

The polling request that is sent has the data structure described with reference to FIG. 7. That is, even when secret keys stored in the secret-key storage unit 301 are arranged in a hierarchical structure, what is included in the polling request is an identifier pksn.

Next, a process of the IC card 400 that has received the polling request will be described. In step S122 (FIG. 2), the IC card 400 executes a polling-response generating and sending process. The polling-response generating and sending process executed by the IC card 400 will be described with reference to a flowchart in FIG. 14.

Each processing executed in steps S331 to S335 is similar to that executed in steps S231 to S235 in FIG. 4, and description thereof has already been given and thus will be omitted here.

However, description will be added here since processing that is executed when a secret key pk is read from the secret-key storage unit 401 in step S333 differs. As described above, in the secret-key storage unit 401, a plurality of secret keys pk' are associated with one identifier pksn'. The CPU 207 of the IC card 400 reads one secret key pk' associated with an identifier pksn' that is the same as an identifier pksn included in a received polling request.

Figure 15:
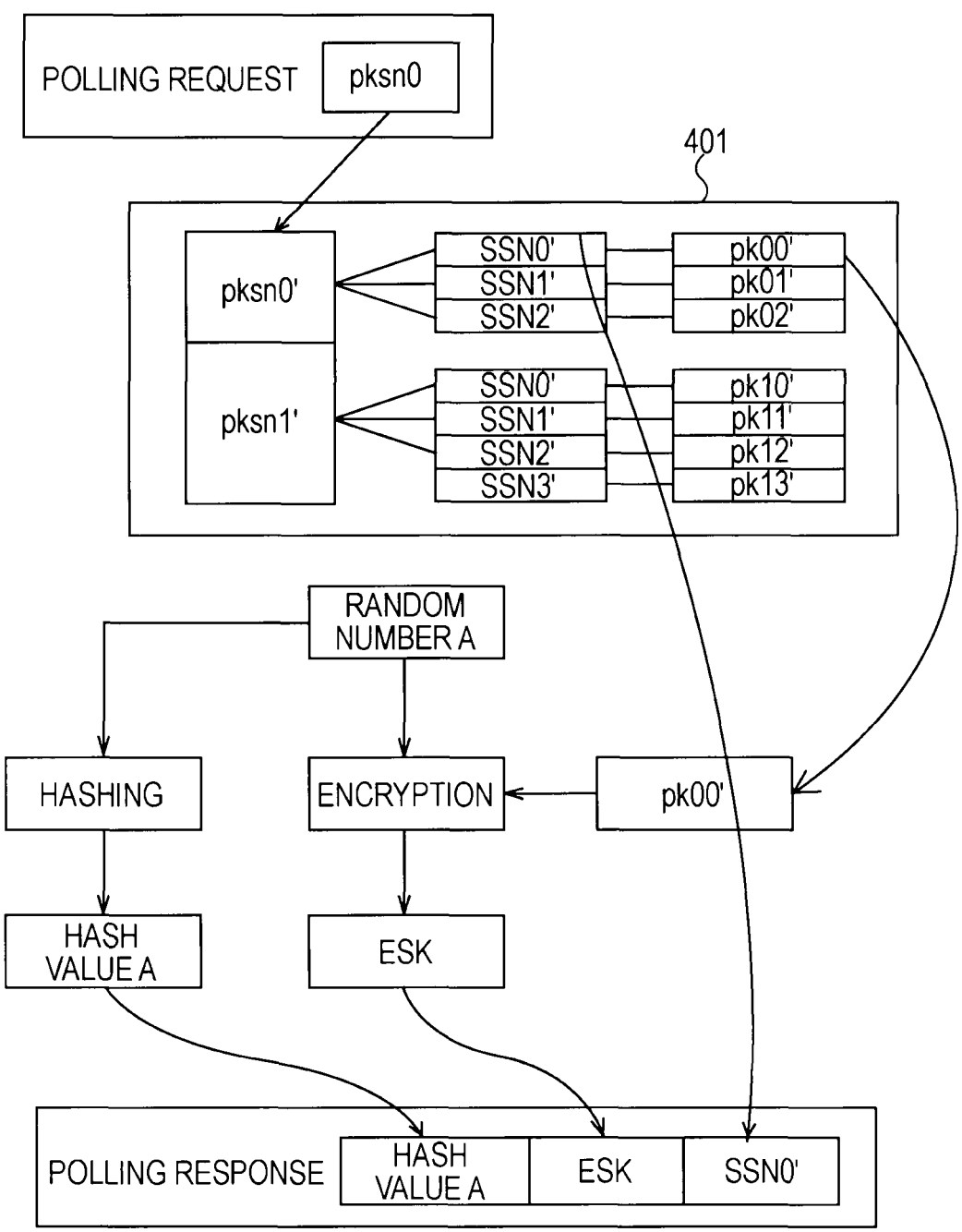
FIG. 15 is a diagram for explaining generation of a polling response.

For example, to describe with reference to FIG. 15, if the identifier pksn included in the received polling request is the identifier pksn0, one secret key pk' among the secret keys pk00' to 02' associated with the identifier pksn0' is read. Here, the description will be continued that the secret key pk00' is read.

For example, such a configuration is possible in which a plurality of secret keys pk' associated with one identifier pksn' are used as keys individually having different security levels and a suitable secret key pk' is read depending on data that is communicated or depending on a counterparty of communication.

Furthermore, for example, such a configuration is possible in which a plurality of secret keys pk' associated with one identifier pksn' correspond individually to different services and a secret key pk' suitable for a service to be executed is read.

A random number A generated by the random-number generating unit 202 is encrypted by the read secret key pk00' to generate a session key ESK.

Figure 14:
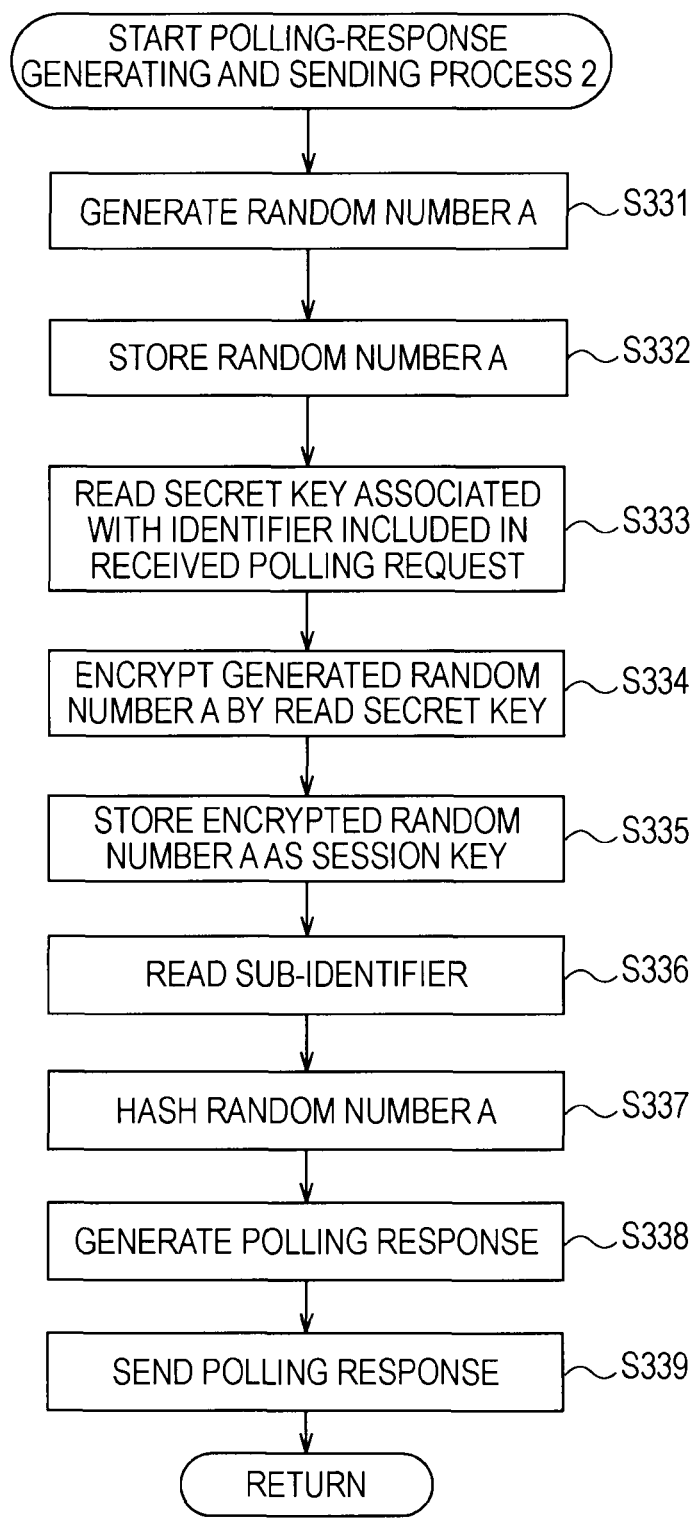
FIG. 14 is a flowchart that explains details of another process relating to generation and sending of a polling response, executed in step S122.

Returning to description of the flowchart in FIG. 14, in step S336, a sub-identifier SSN is read. The sub-identifier SSN that is read is a sub-identifier SSN associated with the secret key pk read in step S334.

Note that although it has been described herein that a secret key pk' is read and then a sub-identifier SSN' identifying the read secret key pk' is read, such a configuration is possible in which a sub-identifier SSN' is read and then a secret key pk' corresponding to the sub-identifier SSN' is read, or in which these are read simultaneously. The order of execution can be modified as appropriate and is not limited to the order shown in the embodiment, which similarly applies also to processing in other steps.

In step S337, the hash calculating unit 402 performs a calculation by a hash function on a random number A generated by the random-number generating unit 202. The hash function is a function that uses data to send as input, compresses the input data into data having a predetermined bit length, and outputs the result as a hash value. The hash function has such characteristics that it is difficult to restore input data from a hash value that is output, and that it is difficult to find input data having hash values of the same results of output (it is one-way).

Using such features of the hash function, checking of the credibility or the like of exchanged data is performed. Here, a hash calculation is performed in order to check whether the secret key pk' (secret key pk) individually read on the side of the IC card 400 and on the side of the reader/writer 300 match.

In step S337, a hash value A has been generated by applying the hash function to the random number A, in step S338, a polling response is generated. The polling response that is generated is configured to include the hash value A, the session key ESK, and the sub-identifier SSN', as shown in FIG. 15.

That is, when the keys stored in the secret-key storage unit 401 has a hierarchical structure, the polling response is configured to include the hash value A, the session key ESK, and the sub-identifier SSN.

The polling response will be described further with reference to FIG. 16. Of the data structure of the polling request shown in FIG. 16, description of parts that coincide with the data structure of the polling request shown in FIG. 9 will be omitted.

Figure 16:
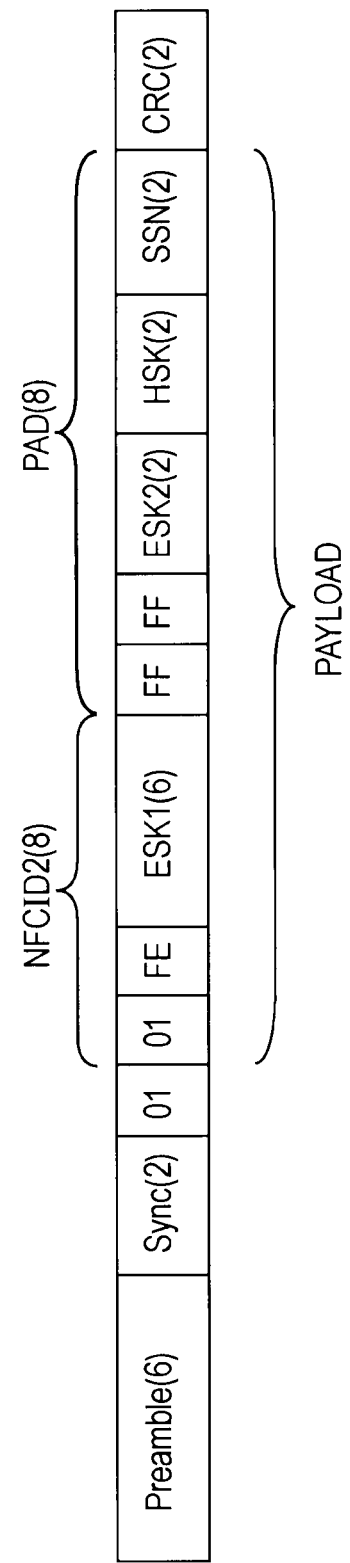
FIG. 16 is a diagram for explaining a data structure of a polling response.

In the data structure of the polling request shown in FIG. 16, in the PAD area of the payload, an area where the hash value A is stored (an area denoted as HSK in FIG. 16) and an area where the sub-identifier SSN' is stored (an area denoted as SSN in FIG. 16) are provided. The area where the hash value A is stored is configured of 2 bytes. The area where the sub-identifier SSN' is stored is configured of 2 bytes.

In step S228, a polling response having such a data structure shown in FIG. 16 is generated. Then, in step S339, the generated polling response is sent to the reader/writer 300.

Next, a process of the reader/writer 300 that has received the polling response will be described. The reader/writer 300 executes a random-number obtaining process in step S103 (FIG. 2). The random-number obtaining process executed by the reader/writer 300 will be described with reference to a flowchart in FIG. 17.

Figure 5:
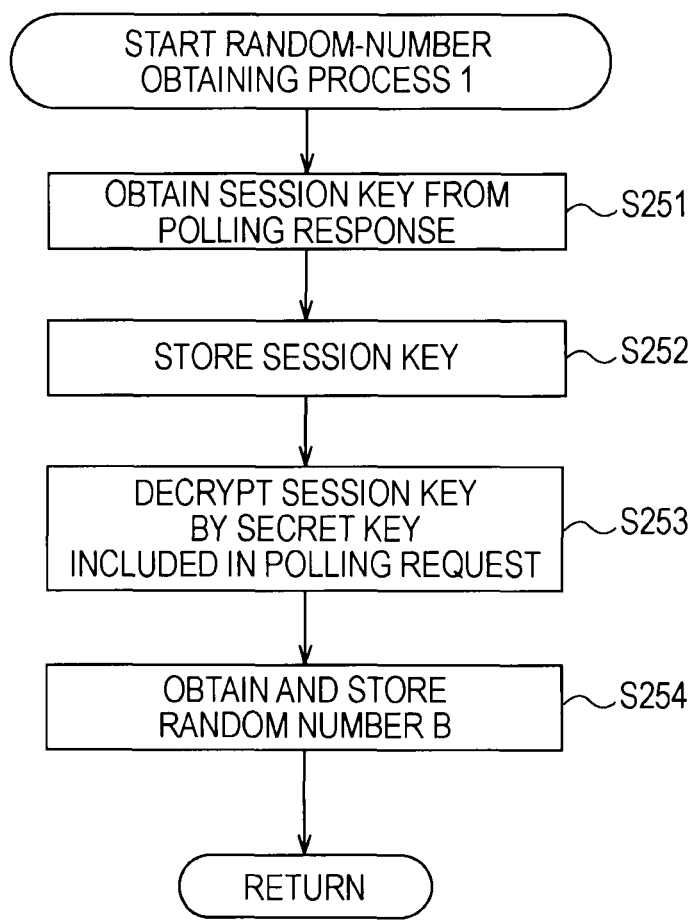
FIG. 5 is a flowchart that explains details of a random-number obtaining process executed in step S103.

Each processing executed in steps S351 to S354 is similar to that in steps S251 to S254 in FIG. 5, and description thereof has already been given and thus will be omitted here.

However, description will be added here since processing that is executed when a secret key pk is read from the secret-key storage unit 301 in step S353. The reader/writer 300 identifies an identifier pksn from the identifier pksn included in the polling request sent to the IC card 400. Furthermore, the reader/writer 300 identifies a sub-identifier SSN from the sub-identifier SSN' included in the polling response received from the IC card 400. If the identifier pksn and the sub-identifier SSN are identified, it is possible to identify one secret key pk.

Figure 18:
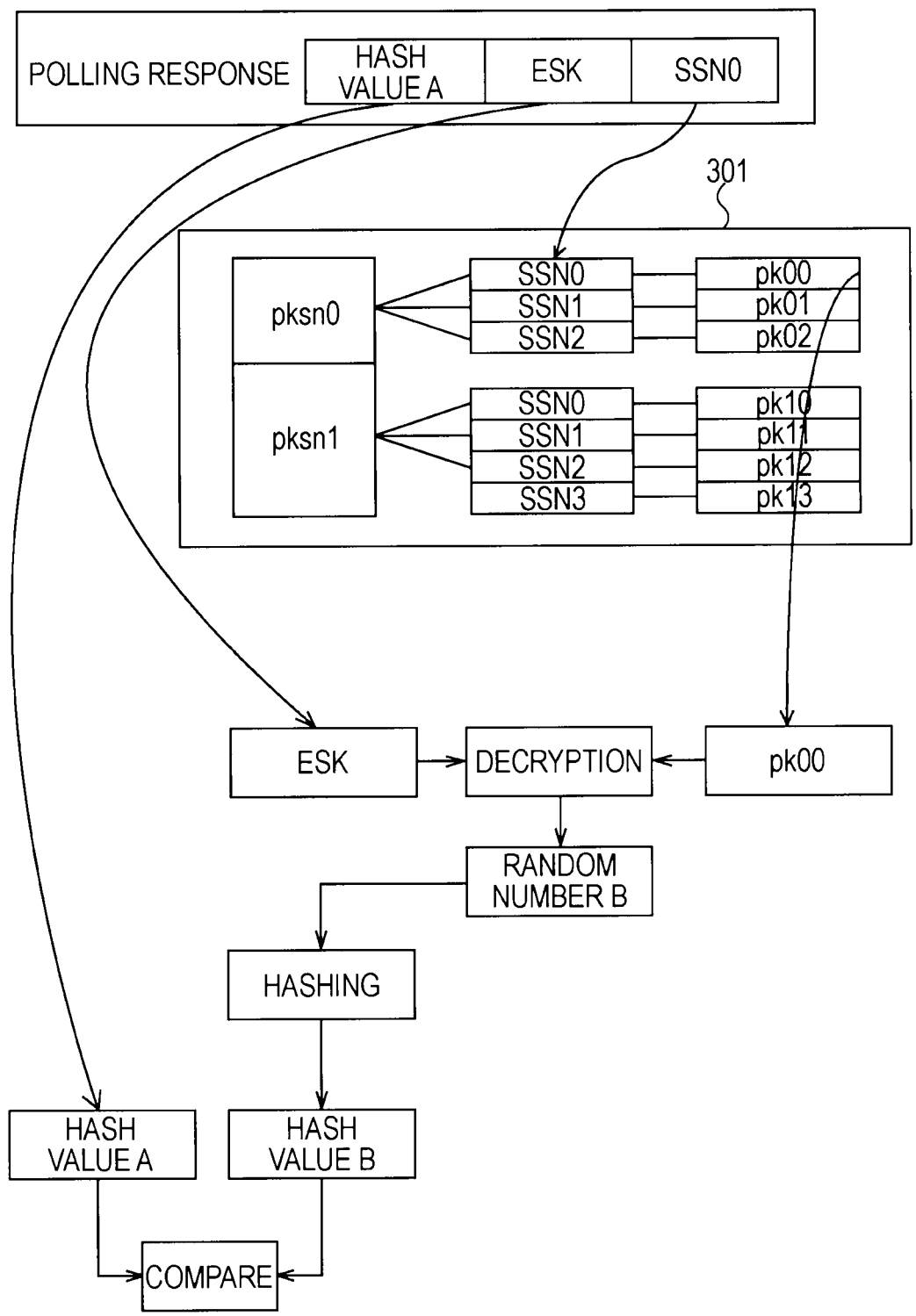
FIG. 18 is a diagram for explaining a process at a time of obtaining a random number B from a polling response.

Further description will be added with reference to FIG. 18. In the example shown in FIG. 18, the sub-identifier SSN0' is stored as a sub-identifier SSN' in the polling response received from the IC card 400, so that the sub-identifier SSN0 is identified from the sub-identifier SSN0'.

Furthermore, the reader/writer 300 remembers that data of the identifier pksn0 has been stored as an identifier pksn in the polling request sent to the IC card 400. Thus, the secret key pk00 is identified from information indicating the identifier pksn0 and information indicating the sub-identifier SSN0. Thus, in this case, the secret key pk00 is read as a secret key pk.

The session key ESK included in the polling request is decrypted using the read secret key pk00 as a key, thereby obtaining a random number B.

Figure 17:
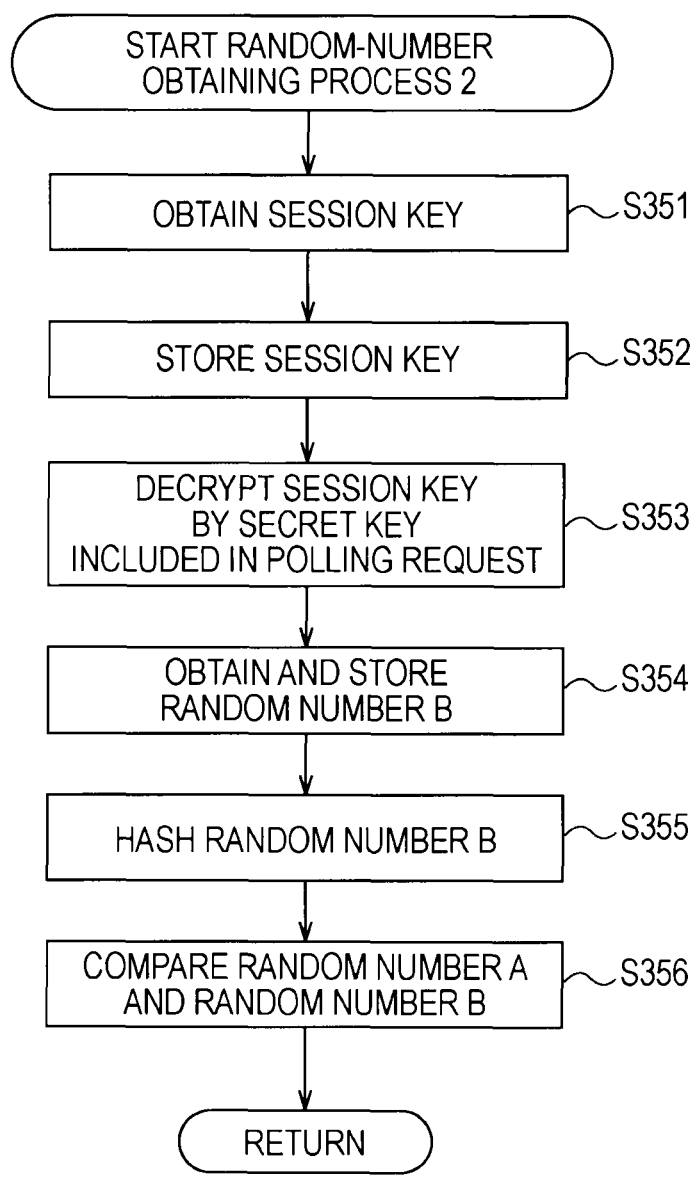
FIG. 17 is a flowchart that explains details of another process relating to obtaining of a random number, executed in step S103.

Returning to description of the flowchart in FIG. 17, when the random number B has been obtained through the processing in steps S351 to S354, in step S355, the hash calculating unit 302 (FIG. 11) applies a hash function to the random number B to generate a hash value B.

In step S356, the CPU 105 compares the hash value A included in the polling response input by the input/output unit 102 with the hash value B generated by the hash calculating unit 302.

The need for comparing the hash value A with the hash value B will be additionally described with reference to FIG. 18. In the description with reference to FIG. 18, as described above, the secret key pk00 is identified from the information indicating the identifier pksn0 and the information indicating the sub-identifier SSN0. If this secret key is identified incorrectly, it turns out that the hash value A and the hash value B do not match.

The identifier pksn has been selected on the side of the reader/writer 300, and the sub-identifier SSN has been selected on the side of the IC card 400. If the relationship among the identifier pksn, sub-identifier SSN, and secret key pk stored in the reader/writer 300 is the same as the relationship among the identifier pksn', sub-identifier SSN', and secret key pk' stored in the IC card 400, it is presumed that the possibility of incorrectly identifying a secret key pk is low. However, if these relationships are not the same, there exists a possibility of incorrectly identifying a secret key pk.

Furthermore, for example, if the secret key pk corresponding to the sub-identifier SSN' selected on the side of the IC card 400 is not held on the side of the reader/writer 300 (e.g., if different secret keys are held on the side of the reader/writer 300 and on the side of the IC card 400), it is not possible to uniquely identify a secret key pk, so that the hash value A and the hash value B do not match.

Considering the above, such a configuration is employed in which hash values are compared so that it is possible to check whether secret keys pk (secret keys pk used for encryption or decryption) selected on the side of the reader/writer 300 and on the side of the IC card 400 match.

As described above, by storing a hash value in a polling response, the validity of a session key can be checked on the side of the reader/writer 300.

Note that, although in the communication system 50 shown in FIG. 1, in other words, in the case of secret keys not having a hierarchical structure, such a configuration is employed in which processing such as comparison of hash values to check whether secret keys pk selected on the side of the reader/writer 300 and on the side of the IC card 400 match is not executed, obviously, in the communication system 50 shown in FIG. 1, it is possible to employ such a configuration in which processing such as comparison of hash values is executed to check secret keys pk.

By managing a plurality of secret keys pk in the reader/writer 300 and the IC card 400 as described above, it is possible to encrypt and decrypt a plurality of services by different secret keys pk, so that it becomes possible to use a secret key pk on a service-by-service basis even when a plurality of services are dealt with. Furthermore, by establishing a communication session as described above, the security of communication can be improved.

Although the above-described embodiment has been described by way of an example of wireless communication, it is possible to apply the present invention to wired communication. Furthermore, the present invention is not limited to the above-described embodiment, the present invention can be applied to communication using a plurality of keys held by mutual apparatuses when some data is exchanged between two apparatuses.

The terms information processing apparatus and device in this specification corresponds to, for example, an initiator and a target in the NFCIP-1 standard, i.e., an apparatus that generates an RF field and initiates NFCIP-1 communication and an apparatus that responds to an instruction from the initiator using load modulation or modulation of an RF field generated by itself, respectively. Furthermore, these apparatuses may be communication apparatuses having mounted thereon one or more IC chips of their individual functions and having other functions or the like.

[Regarding Recording Medium]

The series of processes described above can be executed either by hardware or by software. When the series of processes described above is executed by software, programs constituting the software are executed by the CPU 105 or the CPU 207 in FIG. 1, and these programs are read from recording media or the like readable by the reader/writer 100 (300) or the IC card 200 (400).

In this specification, the steps of executing the series of processes described above obviously includes processes that are executed sequentially in the orders described, and also includes processes that are not necessarily processed sequentially but executed in parallel or individually.

The invention claimed is:

1. A communication system, comprising:
an information processing apparatus and a device that perform a communication, wherein
the information processing apparatus comprises:
a first storage unit that stores one or more keys;
a polling-request generating unit that generates a polling request including:
a first key identifier, the first key identifier only identifying a key of the one or more keys,
the key identified by the first key identifier, and
a second key identifier subordinate to the first key identifier;
an obtaining unit that identifies the key from the first key identifier included in the polling request and the second key identifier, that reads the key from the first storage unit, and that decrypts encrypted data by the key to obtain a random number, the encrypted data being included in a polling response supplied to the information processing apparatus from the device in response to the polling request; and
a first hash calculating unit that performs a calculation in which a hash function is applied to the random number obtained by decrypting the encrypted data to calculate a first hash value; and
a comparing unit that compares the first hash value calculated by the first hash calculating unit with a second hash value included in the polling response; and
the device comprises
a random-number generating unit that generates the random number;
a second storage unit that stores one or more keys;
a reading unit that reads the key corresponding to the first key identifier included in the polling request from the second storage unit;
an encrypting unit that encrypts the random number generated by the random-number generating unit by the key read by the reading unit;
a second hash calculating unit that performs a calculation in which a hash function is applied to the random number generated by the random-number generating unit to calculate the second hash value; and a polling-response generating unit that generates the polling response including the second hash value, the second key identifier, and data of the random number encrypted by the encrypting unit.

2. The communication system according to claim 1, wherein the key is uniquely identified by the first key identifier and the second key identifier, and each of the first storage unit and the second storage unit stores each of the first key identifier, the key second identifier, and the key in an association.

3. A communication method of a communication system configured of an information processing apparatus and a device that perform a communication, wherein the method comprises:

storing one or more keys;
generating a polling request in which:
a first key identifier only identifying a key of the one of more keys is included,
the key identified by the first key identifier is included, and
a second key identifier subordinate to the first key identifier is included;
identifying the key from the first key identifier included in the polling request and the second key identifier;
reading the key, and decrypting encrypted data by the key to obtain a random number, the encrypted data being included in a polling response supplied to the information processing apparatus from the device in response to the polling request;
applying a hash function to the random number obtained by the decrypting to calculate a first hash value;
comparing the first hash value calculated by the applying with a second hash value included in the polling response;
generating the random number;
reading the key corresponding to the first key identifier included in the polling request;
encrypting the generated random number by the read key;
applying a hash function to the random number generated by the generating to calculate the second hash value; and
generating the polling response including the second hash value, the second key identifier, and data of the encrypted random number.

4. An information processing apparatus that performs a communication with a device, comprising:
a storage unit that stores one or more keys;
a polling-request generating unit that generates a polling request in which:
a first key identifier identifying only a key of the one of more keys is included,
the key identified by the first key identifier is included, and
a second key identifier subordinate to the first key identifier is included;
an obtaining unit that identifies the key from the first key identifier included in the polling request and the second key identifier, that reads the key from the storage unit, and that decrypts encrypted data by the key to obtain a random number,
a hash value, the encrypted data, and the second key identifier being included in a polling response supplied to the information processing apparatus in response to the polling request;

a hash calculating unit that performs a calculation in which a hash function is applied to the random number obtained by decrypting the encrypted data to calculate a hash value; and
a comparing unit that compares the hash value calculated by the hash calculating unit with the hash value included in the polling response.

5. The information processing apparatus according to claim 4, wherein the key is uniquely identified by the first key identifier and the second key identifier, and the storage unit stores each of the first key identifier, the second key identifier, and the key in an association.

6. A communication method of an information processing apparatus that performs a communication with a device, the communication method comprising:
controlling a reading of one key from one or more keys stored in a storage means;
generating a polling request in which:
a first key identifier only identifying the one key is included,
the one key identified by the first key identifier is included, and
a second key identifier subordinate to the first key identifier is included;
identifying the one key from the first key identifier included in the polling request and the second key identifier;
reading the one key from the storage means under a control of the controlling, and decrypting encrypted data by the one key to obtain a random number,
a hash value, the encrypted data, and the second key identifier being included in a polling response supplied to the information processing apparatus in response to the polling request;
applying a hash function to the random number obtained by the decrypting to calculate a hash value; and
comparing the hash value calculated by the applying with the hash value included in the polling response.

7. A non-transitory recording medium having a program recorded thereon, the program causing a computer that controls an information processing apparatus that performs a communication with a device to execute a processing comprising:
controlling a reading of one key from one or more keys stored in a storage means;
generating a polling request in which:
a first key identifier only identifying the one key is included, the
one key identified by the first key identifier is included, and
a second key identifier subordinate to the first key identifier is included;
identifying the one key from the first key identifier included in the polling request and the second key identifier;
reading the one key from the storage means under a control of the controlling, and decrypting encrypted data by the one key to obtain a random number,
a hash value, the encrypted data, and the second key identifier being included in a polling response supplied to the information processing apparatus in response to the polling request;
applying a hash function to the random number obtained by the decrypting to calculate a hash value; and
comparing the hash value calculated by the applying with the hash value included in the polling response.

8. A device that performs a communication with an information processing apparatus, the device comprising:
- a random-number generating unit that generates a random number;
- a storage unit that stores one or more keys;
- a reading unit that reads a key of the one or more keys from the storage unit, where the key corresponding to a first key identifier, the key identified by the first key identifier, and a second key identifier subordinate to the first key identifier are each included in a polling request to the device;
- an encrypting unit that encrypts the random number generated by the random-number generating unit by the key read by the reading unit;
- a hash calculating unit that performs a calculation in which a hash function is applied to the random number to calculate a hash value; and
- a polling-response generating unit that generates a polling response including the hash value, the second key identifier, and data of the random number encrypted by the encrypting unit.

9. The device according to claim 8, wherein the key is uniquely identified by the first key identifier and the second key identifier, and the storage unit stores each of the first key identifier, the second key identifier, and the key in an association.

10. A communication method of a device that performs a communication with an information processing apparatus, the communication method comprising:
- generating a random number;
- controlling a processing for reading a key from a storage means where one or more keys are stored, and where the key corresponding to a first key identifier, the key identified by the first key identifier, and a second key identifier subordinate to the first key identifier are each included in a polling request to the device;
- encrypting the random number generated in the generating by the key whose reading has been controlled in the controlling;
- applying a hash function to the random number to calculate a hash value; and
- generating a polling response including the hash value, the second key identifier, and data of the random number encrypted in the encrypting.

11. A non-transitory recording medium having a program recorded thereon, the program causing a computer that controls a device that performs a communication with an information processing apparatus to execute a processing comprising:
- generating a random number;
- controlling a processing for reading a key from a storage means where one or more keys are stored, and where the key corresponding to a first key identifier, the key identified by the first key identifier, and a second key identifier subordinate to the first key identifier are each included in a polling request to the device;
- encrypting the random number generated in the generating by the key whose reading has been controlled in the controlling;
- applying a hash function to the random number to calculate a hash value; and
- generating a polling response including the hash value, the second key identifier, and data of the random number encrypted in the encrypting.

* * * * *